US008345595B1

(12) United States Patent
Chau et al.

(10) Patent No.: US 8,345,595 B1
(45) Date of Patent: Jan. 1, 2013

(54) SECTOR-BASED QUALITY-OF-SERVICE ENFORCEMENT

(75) Inventors: Linda Huan-Chin Chau, Fremont, CA (US); Kosol Jintaseranee, Sunnyvale, CA (US); Jing Jong Yea, Hillsborough, CA (US); Soshant Bali, Menlo Park, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1041 days.

(21) Appl. No.: 12/188,467

(22) Filed: Aug. 8, 2008

(51) Int. Cl.
*H04W 4/00* (2009.01)

(52) U.S. Cl. .................................. 370/328
(58) Field of Classification Search ............. 370/328
See application file for complete search history.

(56) References Cited

U.S. PATENT DOCUMENTS

| | | | | |
|---|---|---|---|---|
| 6,631,122 | B1 * | 10/2003 | Arunachalam et al. | 370/332 |
| 6,654,363 | B1 | 11/2003 | Li et al. | |
| 6,934,555 | B2 * | 8/2005 | Silva et al. | 455/522 |
| 7,948,944 | B2 * | 5/2011 | Li et al. | 370/330 |
| 8,009,675 | B2 * | 8/2011 | Andersson | 370/395.21 |
| 2006/0105759 | A1 * | 5/2006 | Betge-Brezetz et al. | 455/422.1 |
| 2007/0002868 | A1 * | 1/2007 | Qian et al. | 370/395.21 |
| 2007/0133428 | A1 * | 6/2007 | Taylor et al. | 370/252 |
| 2007/0195788 | A1 | 8/2007 | Vasamsetti et al. | |
| 2009/0042537 | A1 * | 2/2009 | Gelbman et al. | 455/406 |
| 2009/0086651 | A1 * | 4/2009 | Luft et al. | 370/253 |

* cited by examiner

*Primary Examiner* — Mark Rinehart
*Assistant Examiner* — Maharishi Khirodhar

(57) ABSTRACT

What is disclosed is a communication system and method of operating a communication system, where a wireless access node configured to receive packet communications from wireless devices communicating in sectors over wireless links, and the packet communications indicate an application type. A wireless access node determines wireless device identifiers of the wireless devices and sector identifiers of the sectors and transfers the packet communications, the wireless device identifiers, and the sector identifiers. A packet processing system is configured to receive the packet communications, the wireless device identifiers, and the sector identifiers; determine the application types of the packet communications; determine sector activity profiles by way of the application types, the wireless device identifiers, and the sector identifiers; determine a quality-of-service policies based on the activity profiles; and transfer the quality-of-service policies. The wireless access node is configured to receive the quality-of-service policies and enforce a level of service to the wireless devices over the wireless links based on the quality-of-service policies.

18 Claims, 6 Drawing Sheets

SECTOR-BASED QUALITY-OF-SERVICE ENFORCEMENT

TECHNICAL FIELD

Aspects of the embodiments are related to the field of communications, and in particular, to wireless communication network architectures and services.

TECHNICAL BACKGROUND

Data packets transferred across computer networks can receive different levels of service. This level of service typically corresponds to the attention given to the data packets when transferred through network equipment, such as gateways and routers, and to the status and properties of the data. This can be useful in packet-based networks, such as wireless networks and the Internet, where data packet transmission times are highly variable and dependent upon traffic patterns and available bandwidth. The level of service can be based upon many factors, some of which include network congestion status, data traffic application type (for example, telephony, video, or email), or by agreement between the network provider and the data originator or recipient.

Application types of data packets can be determined by certain network equipment capable of inspecting the contents of data packets. Typically, network equipment does not inspect the contents of data packets, instead only inspecting the header or addresses attached to the data packets. Inspection of the contents of data packets allows for more information to be gleaned on the data packet application type and payload contents, beyond what the headers or addresses can indicate. Decisions based upon these contents can be made in the transfer of data packets through various network elements in a communication system.

OVERVIEW

What is disclosed is a method of operating a communication system comprising, in a wireless access node, receiving packet communications from wireless devices communicating in sectors over wireless links, wherein the packet communications indicate an application type; determining wireless device identifiers of the wireless devices and sector identifiers of the sectors; and transferring the packet communications, the wireless device identifiers, and the sector identifiers. In a packet processing system, receiving the packet communications, the wireless device identifiers, and the sector identifiers; determining the application types of the packet communications; determining activity profiles by way of the application types, the wireless device identifiers, and the sector identifiers; determining quality-of-service policies based on the activity profiles; and transferring the quality-of-service policies. In the wireless access node, receiving the quality-of-service policies and enforcing a level of service to the wireless devices over the wireless links based on the quality-of-service policies.

What is further disclosed is a communication system with a wireless access node configured to receive packet communications from wireless devices communicating in sectors over wireless links, wherein the packet communications indicate an application type; determine wireless device identifiers of the wireless devices and sector identifiers of the sectors; and transfer the packet communications, the wireless device identifiers, and the sector identifiers. A packet processing system is configured to receive the packet communications, the wireless device identifiers, and the sector identifiers; determine the application types of the packet communications; determine activity profiles by way of the application types, the wireless device identifiers, and the sector identifiers; determine quality-of-service policies based on the activity profiles; and transfer the quality-of-service policies. The wireless access node is configured to receive the quality-of-service policies and enforce a level of service to the wireless devices over the wireless links based on the quality-of-service policies.

BRIEF DESCRIPTION OF THE DRAWINGS

In the drawings, like reference numerals designate corresponding parts throughout the several views.

DETAILED DESCRIPTION

Example #1

Figure 1:
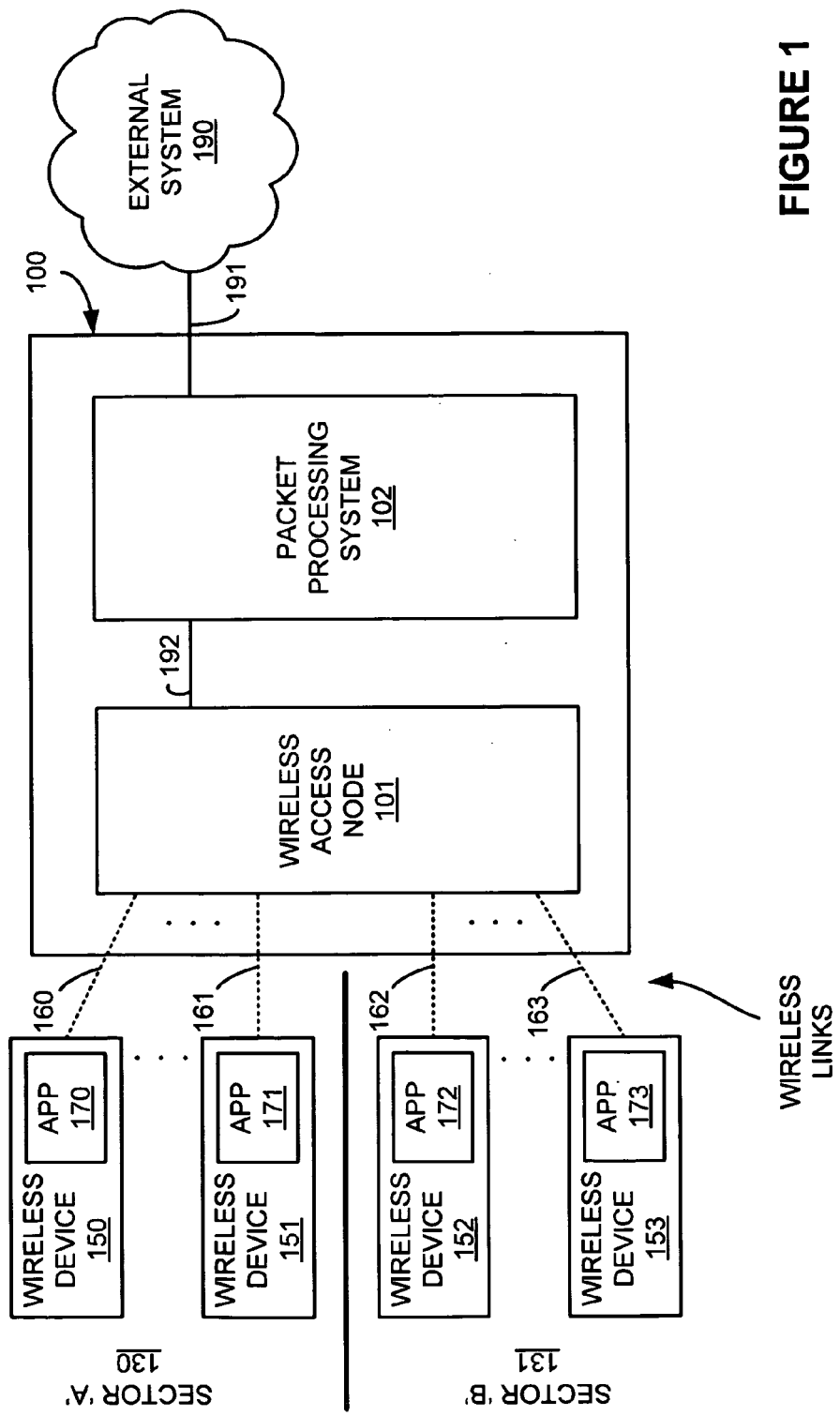
FIG. 1 is a system diagram illustrating a communication system.

FIG. 1 is a system diagram illustrating communication system 100. Communication system 100 includes wireless access node 101 and packet processing system 102. Also shown in FIG. 1 are wireless devices 150-153 and external system 190. Wireless devices 150-153 include applications 170-173. Wireless device 150 and wireless access node 101 communicate over wireless link 160. Wireless device 151 and wireless access node 101 communicate over wireless link 161. Wireless device 152 and wireless access node 101 communicate over wireless link 162. Wireless device 153 and wireless access node 101 communicate over wireless link 163. Wireless devices 150 and 151 communicate in sector 'A' 130 and wireless devices 152 and 153 communicate in sector 'B' 131. Wireless access node 101 and packet processing system 102 communicate over link 192. Packet processing system 102 and external system 190 communicate over link 191.

Wireless devices 150-153 include telephones, transceivers, computers, digital assistants, Internet appliances, or some other wireless communication apparatuses—including combinations thereof. Wireless access node 101 can be any type of communications network equipment capable of receiving and transmitting communication packets. Wireless access node 101 could include a radio node controller (RNC), wireless base station, antenna, wireless access point, authentication, authorization and accounting (AAA) equipment, telephone switch, router, gateway, or some other type of communication equipment—including combinations thereof. External system 190 could include an Internet network, wireless network, telephony network, optical network, enterprise network, local area network, or some other type of communication network or communication device—including combinations thereof. Packet processing system 102 includes equipment to inspect communication packets originating in wireless devices 150-153; such equipment may comprise routers, switches, gateways, computer systems, servers, or some other type of communication network equipment or processing equipment—including combinations thereof.

Wireless links 160-163 use the air or space as the transport media. Wireless links 160-163 could use various protocols, such as wireless fidelity (WiFi), code division multiple access (CDMA), Global System for Mobile communications (GSM), high-speed packet access (HSPA), worldwide interoperability for microwave access (WiMAX), Internet, Internet protocol (IP), local-area network (LAN), telephony, or some other communication format—including combinations thereof. Links 191 and 192 use various communication media, such as air, metal, optical fiber, or some other signal propagation path—including combinations thereof. Links 191 and 192 use various protocols, such as Internet, Internet protocol, local-area network, telephony, optical networking, wireless communication, wireless fidelity, code division multiple access, worldwide interoperability for microwave access, or some other communication format—including combinations thereof. Links 191 and 192 could be direct links or it might include various intermediate equipment, components, systems, and networks. It should be understood that in examples of communication system 100, a different number of wireless devices could communicate with wireless access node 101 over a different number of wireless links.

Communication packets are transferred between wireless devices 150-153 and wireless access node 101 over wireless links 160-163. Communication packets received in wireless access node 101 can be transferred to packet processing system 102 or back to wireless devices 150-153 over wireless links 160-163. Packet processing system 102, for example, can transfer communication packets with wireless access node 101 over link 192 and external system 190 over link 191.

Figure 2:
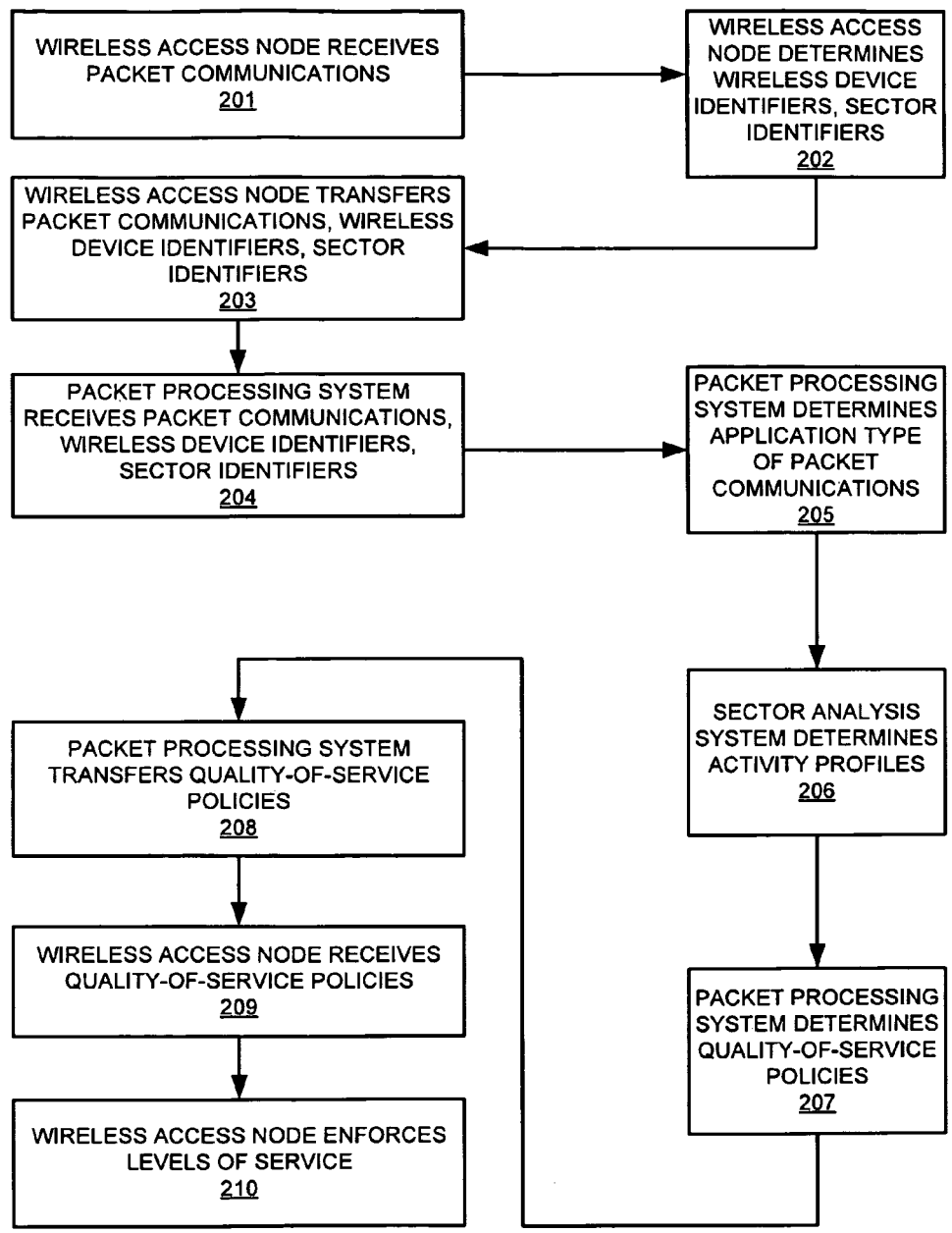
FIG. 2 is a flow diagram illustrating a method of operation of a communication system.

FIG. 2 is a flow diagram that illustrates a method of operation of communication system 100. In FIG. 2, wireless access node 101 receives (201) communication packets from wireless devices 150-153 over wireless links 160-163. Wireless access node 101 determines (202) the wireless device identifiers and sector identifiers for wireless devices 150-153. Wireless access node 101 transfers (203) the communication packets, wireless device identifiers, and sector identifiers.

A communication packet could comprise an IP packet, Ethernet packet, or other type of data packet—including combinations thereof. The communication packets and associated data payloads could contain any number of different varieties of data types, or applications. As shown in FIG. 1, wireless devices 150-153 include applications 170-173, respectively. An application comprises a user service as implemented in the communication packets. The application could be distinguished among different service providers, even though such service providers are providing similar types of user services. For example, although Voice over IP (VoIP) is a type of user service, various service providers, such as Skype™ and Vonage™ could be distinguished from each other, much like the individual user services. The user services, for example, could include Internet communications, telephony, video, audio, email, text, chat data, web pages, peer-to-peer (P2P) communications, Voice over IP (VoIP), as well as other data and application types—including combinations thereof.

A wireless device identifier is an identifier for the wireless device from which a communication packet originates. The wireless device identifier comprises a network address, IP address, user number, personal identification number (PIN), subscriber identity module (SIM) number, network access identifier (NAI), or other identifier—including combinations thereof.

The sector identifier is an identifier for the sector within which a wireless device is communicating. The sector identifier, and likewise the sector, can represent a particular region of wireless coverage, typically served by a single antenna, antenna tower, or base station. As shown in FIG. 1, wireless devices 150 and 151 communicate in sector 'A' 130 and wireless devices 152 and 153 communicate in sector 'B' 131.

Packet processing system 102 receives (204) the communication packets, wireless device identifiers, and sector identifiers. Packet processing system 102 also receives, along with the various identifiers, an association or correlation between the sector identifier, device identifier, and communication packet address information. Packet processing system 102 determines (205) the application type of the communication packets. Packet processing system 102 can determine the application type of the communication packets by any manner of methods. One example method is by use of packet inspection equipment which looks at the data payload of a communication packet to determine an application type.

Packet processing system 102 then determines (206) sector activity profiles for the sectors. A sector activity profile comprises the communication packet application activities across a selected sector. Packet processing system 102 uses the sector identifiers to discriminate communication packet activities of a particular sector from another. The activity profile can span the activities of several users, determined by the wireless device identifiers, or may be limited to one user, depending upon the number of wireless devices communicating with wireless access node 101. Each sector of a wireless communication system has a limited amount of bandwidth. A portion of this bandwidth gets used by each wireless device communicating within a particular sector. Each wireless device can use a different amount of bandwidth depending upon the activity or application of the wireless device. For example, a wireless device could be engaged in applications such as a telephony-based call, or perhaps watching a streaming video—each using a different amount of bandwidth.

As noted above, packet processing system 102 also receives, along with the various identifiers, an association or correlation between the sector identifier, device identifier, and communication packet address information. The communication packet address information could comprise, for example, an IP address. From here, packet processing system 102 associates the particular application or activity of the communication packets with a sector based on the correlation between the communication packet address and the sector/device identifiers. Packet processing system 102 can then create a representative aggregation of the bandwidth or communication traffic in a particular sector.

Packet processing system 102 determines (207) quality-of-service policies for wireless devices communicating in sectors. These quality-of-service policies indicate a level of service provided to wireless devices 150-153 over wireless links 160-163. The level of service given to the communication packets can vary on the communication medium, the application type, the level of service purchased by a user, or other factors. For example, the level of service given to wireless devices 150-153 over wireless links 160-163 could be based upon wireless power level, allotted timeslots and scheduling in the wireless communication channels, data rate allowances, data type priority (for example, voice versus data), relegating wireless devices to a particular frequency or channel when communicating over wireless links, or other factors—including combinations thereof. Also, the level of service could vary based upon application type. For example, streaming video could receive a lower level of service than telephony, and e-mail could receive a lower level of service than streaming video. Additionally, a quality-of-service policy could be determined for each application type contained within the communication packets of wireless devices 150-153. In some cases, no distinction is made between the wireless device and the user of the wireless device, whereas in other cases, a distinction could be made.

The quality-of-service policies can be adjusted to bring the activities, applications, or bandwidth of the sector to desirable levels. If the sector activity profile exceeds a threshold level, packet processing system 102 can take action by way of the quality-of-service policies to bring the sector activity profile back into desirable limits. The adjustments that packet processing system 102 may make will vary on the desired results and sector activity profile. For example, if traffic on a sector is composed primarily of video downloads and is limiting the available bandwidth for telephony communications, then packet processing system 102 may decrease the level of service to communication packets containing video applications while maintaining a constant—or increasing—level of service for communication packets containing telephony applications. This action may be taken in an effort to bring the sector activity profile back into bounds of acceptable bandwidth limits. The quality-of-service policies are transferred (208) once determined by packet processing system 102.

Wireless access node 101 receives (209) the quality-of-service policies. Wireless access node 101 then enforces (210) a level of service to wireless devices 150-153 over wireless links 160-163 based upon the quality-of-service policies received.

Example #2

Figure 3:
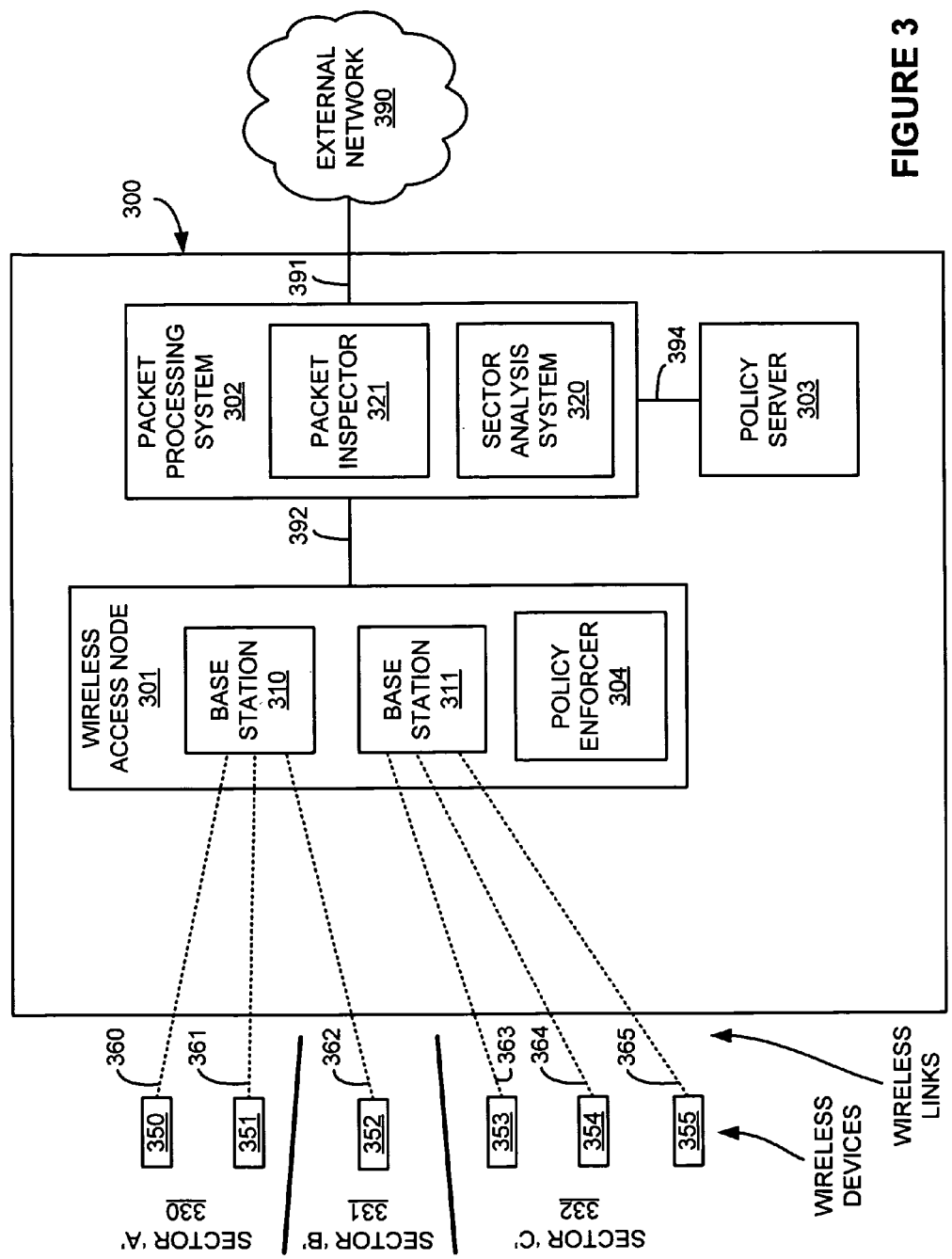
FIG. 3 is a system diagram illustrating a communication system.

FIG. 3 is a system diagram illustrating communication system 300. Communication system 300 includes wireless access node 301, packet processing system 302, and policy server 303. Wireless access node 301 includes base stations 310 and 311 as well as policy enforcer 304. Packet processing system 302 includes sector analysis system 320 and packet inspector 321. Also shown in FIG. 3 are wireless devices 350-355 and external network 390.

Wireless devices 350 and 351 and wireless access node 301 communicate over wireless links 360 and 361 in sector 'A' 330. Wireless device 352 and wireless access node 301 communicate over wireless link 362 in sector 'B' 331. Wireless devices 353-355 and wireless access node 301 communicate over wireless links 363-365 in sector 'C' 332. Wireless access node 301 and packet processing system 302 communicate over link 392. Packet processing system 302 and policy server 303 communicate over link 394. Packet inspector 391 and external network 390 communicate over link 391.

Wireless links 360-365 use the air or space as the transport media. Wireless links 360-365 could use various protocols, such as wireless fidelity (WiFi), code division multiple access (CDMA), Global System for Mobile communications (GSM), high-speed packet access (HSPA), worldwide interoperability for microwave access (WiMAX), Internet, Internet protocol (IP), local-area network (LAN), telephony, or some other communication format—including combinations thereof. Links 391, 392, and 394 use various communication media, such as air, metal, optical fiber, or some other signal propagation path—including combinations thereof. Links 391, 392, and 394 use various protocols, such as RF signaling, Internet, Internet protocol, local-area network, telephony, optical networking, wireless communication, wireless fidelity, code division multiple access, worldwide interoperability for microwave access, or some other communication format—including combinations thereof. Links 391, 392, and 394 could be direct links or it might include various intermediate equipment, components, systems, and networks. It should be understood that in examples of communication system 300, a different number of wireless devices could communicate with wireless access node (and likewise base stations 310 and 311) over a different number of wireless links.

Communication packets are transferred between wireless devices 350-355 and base stations 310 and 311 over wireless links 360-365. Communication packets received in wireless access node 301 and likewise, base stations 310 and 311, can be transferred to packet processing system 302 or back to wireless devices 350-355. Packet processing system 302 can also transfer communication packets with wireless access node 301 over link 392 and external system 390 over link 391.

In communication system 300, wireless devices 350-355 include telephones, transceivers, computers, digital assistants, Internet appliances, or some other wireless communication equipment—including combinations thereof. Wireless access node 301 can be any type of communications network equipment capable of receiving and transmitting data packets and communicating with and/or controlling wireless devices 350-355. In this example, wireless access node 301 includes base stations 310 and 311 as well as policy enforcer 304, but could further include a packet data serving node (PDSN), radio node controller (RNC), wireless access points, authentication, authorization and accounting (AAA) equipment, telephone switches, routers, gateways, further wireless base stations, or some other type of communication equipment—including combinations thereof. In some examples, policy enforcer 304 is not included in wireless access node 101, but instead located externally of wireless access node 101.

Packet processing system 302 includes packet inspector 321 and sector analysis system 320 as well as equipment to transfer communication packets. Packet inspector 321 includes equipment to inspect communication packets originating in wireless devices 350-355 or external network 390 to determine the application type of the communication packets. Such inspection equipment may comprise deep packet inspection (DPI) equipment, routers, switches, gateways, computer systems, special purpose circuitry, servers, or some other type of communication network equipment or processing equipment—including combinations thereof. Sector analysis system 320 includes equipment capable of analyzing the mix of applications contained within communication packets and determining a profile for communications packets across individual sectors of communication network 300 by way of the sector identifiers. Sector analysis system 320 comprises a computer system, processing system, or special purpose circuitry which may include a storage system, user interface, and network and data interfaces—including combinations thereof.

Policy server 303 includes equipment capable of interpreting the sector profiles as established by sector analysis system 320. Policy server 303 creates quality-of-service policies for sectors by determining a proper level of service desired for the communication packets transferred to/from wireless devices in a sector. Policy server 303 comprises a computer system or special purpose circuitry which may include a storage system, user interface, and network and data interfaces—including combinations thereof.

Policy enforcer 304 implements the quality-of-service policies developed by policy server 303. A quality-of-service policy, or set of quality-of-service policies, determines a level of service for communication packets transferred to/from wireless devices 350-355 over wireless links 360-365. Policy enforcer 304 communicates with equipment within wireless access node 301 to enforce these policies on network equipment interfacing with wireless devices 350-355. As shown in FIG. 3, this equipment includes base stations 310 and 311. Policy enforcer 304 may comprise a packet data serving node (PDSN), radio node controller (RNC), wireless access point, telephony switch, router, gateway, or some other type of communication equipment—including combinations thereof. While FIG. 3 shows policy enforcer 304 internal to wireless access node 301, in some examples policy enforcer 304 is external to wireless access node 301.

External network 390 could include an Internet network, wireless network, telephony network, optical network, enterprise network, local area network, metro-area network, or some other type of communication network or communication equipment—including combinations thereof.

Figure 4:
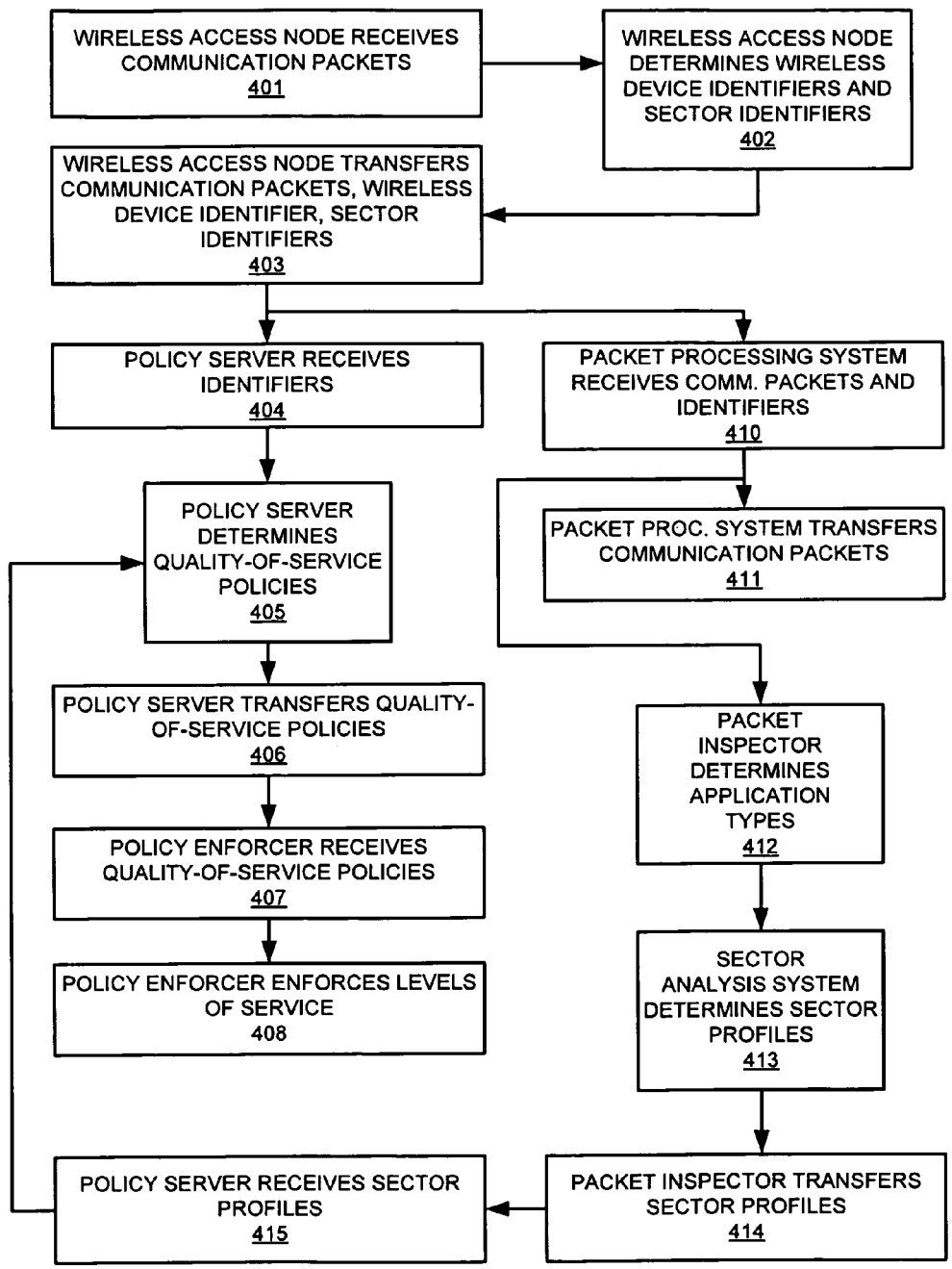
FIG. 4 is a flow diagram illustrating a method of operation of a communication system.

FIG. 4 is a flow diagram that illustrates a method of operation of communication system 300. In FIG. 4, wireless access node 301 (by way of base stations 310 and 311) receives (401) communication packets from wireless devices 350-355 over their respective wireless links 360-365. Wireless access node 301 determines (402) wireless device identifiers, sector identifiers, and transfers (403) the communication packets, wireless device identifiers, and sector identifiers.

A communication packet could comprise an IP packet, Ethernet packet, or other type of data packet—including combinations thereof. The communication packets and associated data payloads could contain any number of different varieties of data types, or applications. An application comprises a user service as implemented in the communication packets. The application could be distinguished among different service providers, even though such service providers are providing similar types of user services. For example, although Voice over IP (VoIP) is a type of user service, various service providers, such as Skype™ and Vonage™ could be distinguished from each other, much like the individual user services. The user services, for example, could include Internet communications, telephony, video, audio, email, text, chat data, web pages, peer-to-peer (P2P) communications, Voice over IP (VoIP), as well as other data and application types—including combinations thereof.

A wireless device identifier is an identifier for the wireless device from which a communication packet originates. A wireless device identifier comprises a network address, IP address, user number, personal identification number (PIN), subscriber identity module (SIM) number, network access identifier (NAI), or other identifier—including combinations thereof. Wireless device identifiers are provided with the packet communications from wireless devices 350-355 in some examples, while in other examples, the wireless device identifiers are determined in base stations 310 and 311.

The sector identifiers are identifiers for the sectors within which wireless devices are communicating. A sector identifier, and likewise a sector, can represent a particular region of wireless coverage, typically served by a single antenna, antenna tower, or base station. As shown in FIG. 3, Wireless devices 350 and 351 communicate in sector 'A' 330, wireless device 352 communicates in sector 'B' 331, and wireless devices 353-355 communicate in sector 'C' 332. In some examples, multiple antennas, antenna towers or base stations could serve a sector. Sectors are further illustrated in FIG. 5, as discussed below.

In FIG. 4, policy server 303 receives (404) the wireless device identifiers and sector identifiers and determines quality-of-service policies for wireless devices 350-355 communicating over wireless links 360-365. These quality-of-service policies can initially be formed upon predetermined levels of service for wireless devices 350-355 over wireless links 360-365, and can be changed during the operation of communication system 300 as detailed below. Once the quality-of-service policies are determined (405), they are transferred.

Policy enforcer 304 receives (407) the quality-of-service policies. In some examples, the quality-of-service policies are received by way of link 394, packet processing system 302, and link 392, while in other examples a direct link between policy server 303 and policy enforcer 304 may exist. Policy enforcer 304 implements the quality-of-service policies developed by policy server 303. In other examples, packet processing system 302 could implement the quality-of-service policies developed by policy server 303. A quality-of-service policy, or set of quality-of-service policies, determines a level of service for communication packets transferred to/from wireless devices 350-355 over wireless links 360-365. Policy enforcer 304 can communicate with base stations 310 and 311 and other equipment in wireless access node 301 to enforce these policies on network equipment interfacing with wireless devices 350-355. During operation of communication system 300, policy enforcer 304 typically receives frequently updated quality-of-service policies.

Packet processing system 302 receives (410) the wireless device identifiers and sector identifiers in addition to the communication packets. Packet processing system 302 also receives, along with the various identifiers, an association or correlation between the sector identifier, device identifier, and communication packet address information. In some examples, packet processing system could establish the correlation between the sector identifier, device identifier, and communication packet address information. Packet processing system can then transfer (411) the communication packets. In addition to transferring the communication packets, packet processing system 302 includes packet inspector 321 and sector analysis system 320.

Packet inspector 321 determines (412) the application type of the communication packets. This is typically accomplished by an inspection of the communication packet contents. Specialized communication equipment can be used for such a task; examples of such equipment include deep packet inspection (DPI) equipment or computer systems. Inspection of the communication packets may not directly reveal an application type. For example, only a portion of a total communication message may be included in a communication packet. However, packet inspector 321 is sophisticated enough to determine the application type by various methods. These methods may include pattern matching across single or multiple sequences of communication packets, a learning mechanism by which packet inspector 321 can be taught to detect certain application types, by other comparison techniques, or other methods—including combinations thereof. Additionally, the sector or user identifiers could be utilized to further refine the packet inspection techniques.

Taking the information derived in packet inspector 321, sector analysis system 320 determines (413) a profile of the activities and an application mix across a sector. As noted above, packet processing system 302 also receives, along with the various identifiers, an association or correlation between the sector identifier, device identifier, and communication packet address information. The communication packet address information could comprise, for example, an IP address. From here, sector analysis system 320 associates the particular application or activity of the communication packets with a sector based on the correlation between the communication packet address and the sector/device identifiers. Sector analysis system 320 then creates a representative aggregation of the bandwidth or communication traffic in a particular sector.

Figure 6B:
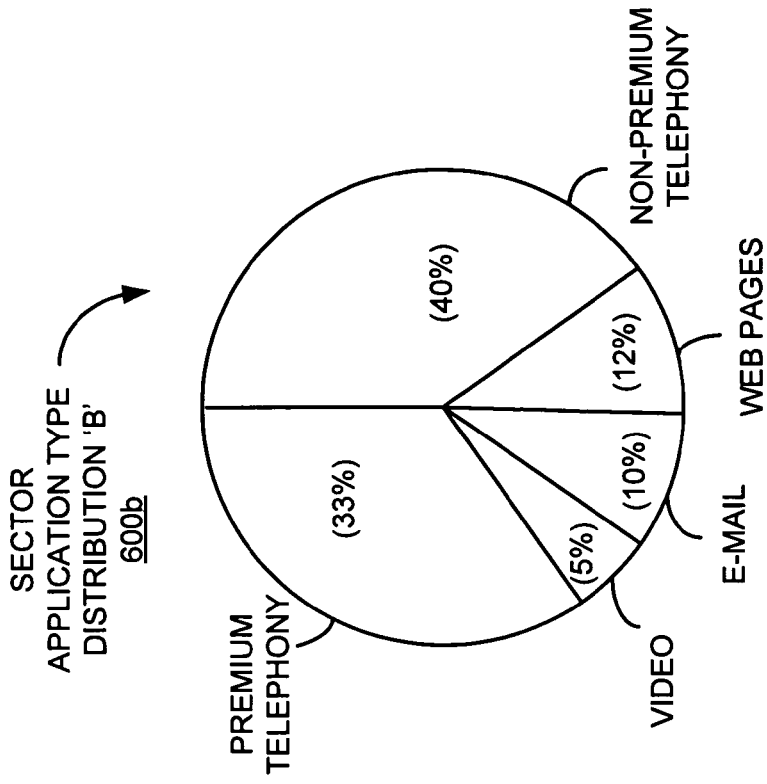
FIGS. 6*a* and 6*b* are charts of activity in a communication system.
Figure 6A:
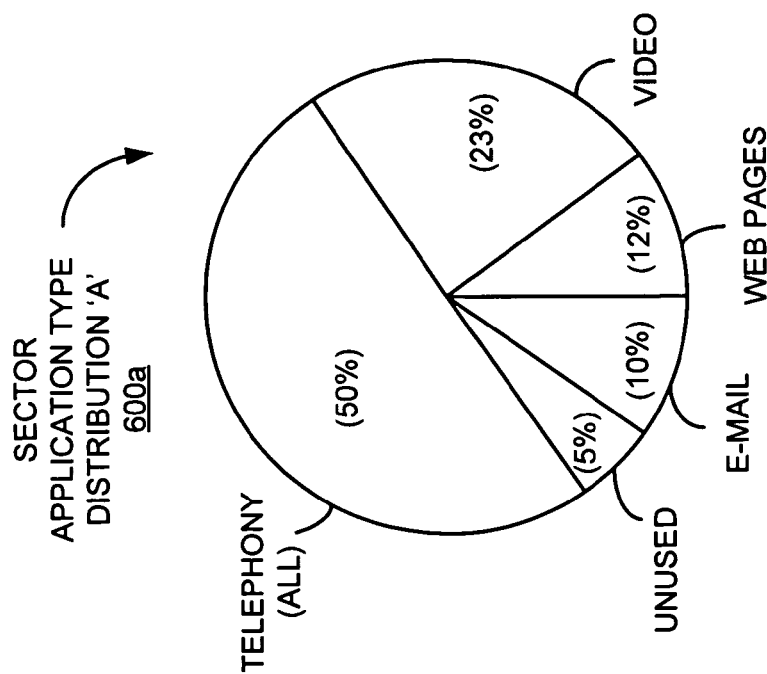

The application types of all wireless devices communicating in a particular sector are mapped. This application mixture is illustrated in FIGS. 6a and 6b, and discussed below. Once sector analysis system 320 determines (413) a sector profile, the profile is transferred (414). This process is typically performed for each sector.

Policy server 303 receives (415) the sector profiles from sector analysis system 320 and again determines (405) a proper level of service desired for the wireless devices in a sector. For example, if a sector is highly loaded or exceeding bandwidth limitations, policy server 303 can develop quality-of-service policies to bring the traffic level in the sector back to desirable levels. In some embodiments, policy server 303 can accomplish this bandwidth limiting feature by developing quality-of-service policies based upon the applications of wireless devices in the sector. For example, policy server 303 could determine that video applications are taking up a large portion of the available bandwidth for the sector to the detriment of telephony applications. Policy server 303 can then determine quality-of-service policies for communication packets comprising video applications in the sector to reduce their level of service—while developing different quality-of-service policies for communication packets comprising telephony applications consistent with a higher level of service. These quality-of-service policies could be developed on-the-fly or according to predetermined quality-of-service parameters that reflect the desired operation of communication network 300.

In addition to using the application mixture of a sector when determining the quality-of-service policies, the wireless device identifiers can also be used. If, for example, the user of a particular wireless device has paid for a higher level of service for a particular application, then the wireless device can accordingly be provided with a higher level of service for such application. In this manner, the sector profile, sector bandwidth limitations, and user identifier can all be utilized to determine proper quality-of-service policies for the sector.

These updated quality-of-service policies are then transferred (406) by policy server 303, and received (407) and enforced (408) by policy enforcer 304, as previously described above.

Figure 5:
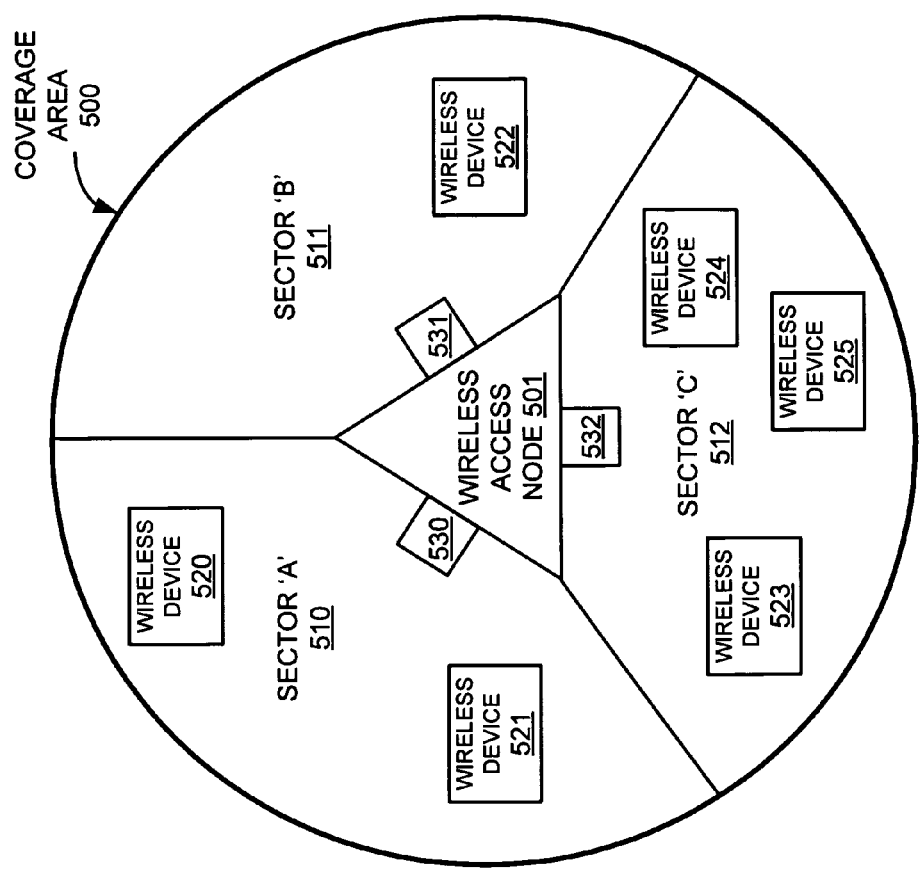
FIG. 5 is a diagram of a wireless communication system coverage area.

FIG. 5 illustrates coverage area 500. As shown in FIG. 5, three antennas, 530-532, define coverage area 500. Coverage area 500 includes a domain within which wireless devices can communicate, which is divided into one or more sectors. Coverage area 500 is thus divided into three portions, or sectors: sector 'A' 510, sector 'B' 511, and sector 'C' 512. Coverage area 500 could be defined by physical boundaries, wireless signal strength, geography, or in a virtual or logical manner. The sector identifier is an identifier for the specific sector within which a wireless device is communicating. The sector, and likewise the sector identifier, divides coverage area 500 into smaller regions, each sector typically served by an antenna, antenna tower, or base station. In some examples, multiple antennas, antenna towers or base stations could serve a sector.

Each antenna 530-531 communicates with wireless access node 501. Examples of this communication can be seen in FIG. 1 and FIG. 3, as previously detailed. A number of wireless devices may communicate within each sector by way of the antenna in each sector. In FIG. 5, antenna 530 and wireless devices 520 and 521 communicate in sector 'A' 510; antenna 531 and wireless device 522 communicate in sector 'B' 511, antenna 532 and wireless devices 523-525 communicate in sector 'C' 512.

FIGS. 6a and 6b illustrate some examples of sector profiles. In FIG. 6a, sector application type distribution 'A' 600a is shown. In sector application type distribution 'A' 600a, a total of 95% of the available bandwidth is represented as used, while 5% of the available bandwidth is shown as unused. The 95% bandwidth utilization in this example is comprised of several applications: 50% telephony, 23% video, 12% web pages, and 10% e-mail. As the sector profile illustrated in FIG. 6a does not have 100% of available bandwidth consumed by applications, the quality-of-service policies for the sector may not need to reduce the level of service for any particular application type. However, if the level of service of certain applications was desired to be higher than others, quality-of-service policies could be tailored as such. For example, perhaps telephony applications would be given a higher level of service that other applications at all times, even when the sector bandwidth is not fully utilized.

In contrast, as shown in FIG. 6b, sector application type distribution 'B' 600b illustrates a fully loaded sector bandwidth. In sector application type distribution 'B' 600b, a total of 100% of the available bandwidth is represented as used. The 100% bandwidth utilization in this example is comprised of several applications: 73% telephony (33% premium telephony and 40% non-premium telephony), 12% web pages, 10% e-mail, and 5% video. Since the sector bandwidth is fully utilized, certain application may experience a reduced level of service if no action is taken by way of quality-of-service policies. For example, certain telephony applications may experience a degraded level of service due to the high bandwidth utilization if all application types are treated equally and given the same level of service. Certain applications may be desired to have a higher level of service than others. Typically, telephony applications are considered to be higher priority applications due to their real-time nature, and could be given a higher level of service than e-mail or web page applications. Moreover, within the telephony application bandwidth, there may be certain telephony applications or wireless devices that could receive an even higher level of service than other telephony applications. For example, wireless device users who have paid for a premium telephony service could receive a higher level of service than those wireless device users who have not. Also, certain telephony applications, or service providers, such as voice over IP (VoIP), Skype™, or Vonage™ could receive a different level of service than traditional voice applications. This different level of service could translate, in some examples, to a controlled data transfer rate or bandwidth.

Although not shown in FIGS. 6a and 6b, the sector application type distributions could also include peer-to-peer (P2P) communication traffic. This application type involves data transfer between two or more endpoints in a network or communication system, many times without a centralized server involvement in an ad-hoc fashion. Since centralized service providers may not exist in some examples of P2P traffic, a specific service provider may not be identified as in other application types. However, several forms of P2P networks or protocols exist, commonly used for file transfer across communication networks such as the Internet. Examples of some P2P network types include Gnutella, BitTorrent™, certain Microsoft Windows™ networks, and Skype™ (also a form of VoIP), as well as many other varieties.

Advantageously, during periods of high bandwidth utilization by P2P application types, the above examples of the communication systems could identify P2P application types provide a different level of service to such application types. This different level of service could translate, in some examples, to a controlled data transfer rate or bandwidth.

FIGS. 1-6 and the preceding descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communication system, comprising:
    in a wireless access node, receiving communication packets from wireless devices communicating in sectors over wireless links, determining wireless device identifiers of the wireless devices, sector identifiers of the sectors, and associations between the communication packets, the wireless device identifiers, and the sector identifiers, and transferring the communication packets, the wireless device identifiers, the sector identifiers, and the associations;
    in a packet processing system, receiving the communication packets, the wireless device identifiers, the sector identifiers, and the associations between the communication packets, the wireless device identifiers, and the sector identifiers, determining application types of the communication packets based on at least the communication packets, determining sector activity profiles for the sectors that relate the application types present in each of the sectors as a portion of total communication packets for each sector, determining quality-of-service policies based on the sector activity profiles to adjust a quality-of-service provided to at least one of the applications in at least one of the sectors, and transferring the quality-of-service policies;
    in the wireless access node, receiving the quality-of-service policies and enforcing a level of service to the wireless devices over the wireless links based on the quality-of-service policies.

2. The method of operating the communication system of claim 1, further comprising:
    in the packet processing system, inspecting payloads of the communication packets to determine the application types.

3. The method of operating the communication system of claim 1, further comprising:
    in the packet processing system, transferring the communication packets.

4. The method of operating the communication system of claim 1, wherein the quality-of-service policies are defined for each of the application types.

5. The method of operating the communication system of claim 1, wherein each of the sectors comprise at least one antenna.

6. The method of operating the communication system of claim 1, wherein the wireless access node comprises at least one base station and wherein the at least one base station comprises at least one sector.

7. The method of operating the communication system of claim 1, wherein the quality-of-service policies comprise controlling a bandwidth of video application types.

8. The method of operating the communication system of claim 1, wherein the quality-of-service policies comprise controlling a bandwidth of peer-to-peer application types.

9. The method of operating the communication system of claim 1, wherein the quality-of-service policies comprise preferring voice application types.

10. A communication system, comprising:
    a wireless access node configured to receive communication packets from wireless devices communicating in sectors over wireless links, wherein the communication packets indicate an application type, determine wireless device identifiers of the wireless devices, sector identifiers of the sectors, and associations between the communication packets, the wireless device identifiers, and the sector identifiers, and transfer the associations, and transfer the communication packets, the wireless device identifiers, the sector identifiers, and the associations;
    a packet processing system configured to receive the communication packets, the wireless device identifiers, the sector identifiers, and the associations between the communication packets, the wireless device identifiers, and the sector identifiers, determine the application types of the communication packets based on at least the communication packets, determine sector activity profiles for the sectors that relate the application types present in each of the sectors as a portion of total communication packets for each sector, determine quality-of-service policies based on the sector activity profiles to adjust a quality-of-service provided to at least one of the applications in at least one of the sectors, and transfer the quality-of-service policies;
    the wireless access node configured to receive the quality-of-service policies and enforce a level of service to the wireless devices over the wireless links based on the quality-of-service policies.

11. The communication system of claim 10, wherein the packet processing system is configured to inspect payloads of the communication packets to determine the application types.

12. The communication system of claim 10, wherein the packet processing system is configured to transfer the communication packets.

13. The communication system of claim 10, wherein the quality-of-service policies are defined for each of the application types.

14. The communication system of claim 10, wherein each of the sectors comprise at least one antenna.

15. The communication system of claim 10, wherein the wireless access node comprises at least one base station and wherein the at least one base station comprises at least one sector.

16. The communication system of claim 10, wherein the quality-of-service policies comprise controlling a bandwidth of video application types.

17. The communication system of claim 10, wherein the quality-of-service policies comprise controlling a bandwidth of peer-to-peer application types.

18. The communication system of claim 10, wherein the quality-of-service policies comprise preferring voice application types.

* * * * *